UNITED STATES PATENT OFFICE.

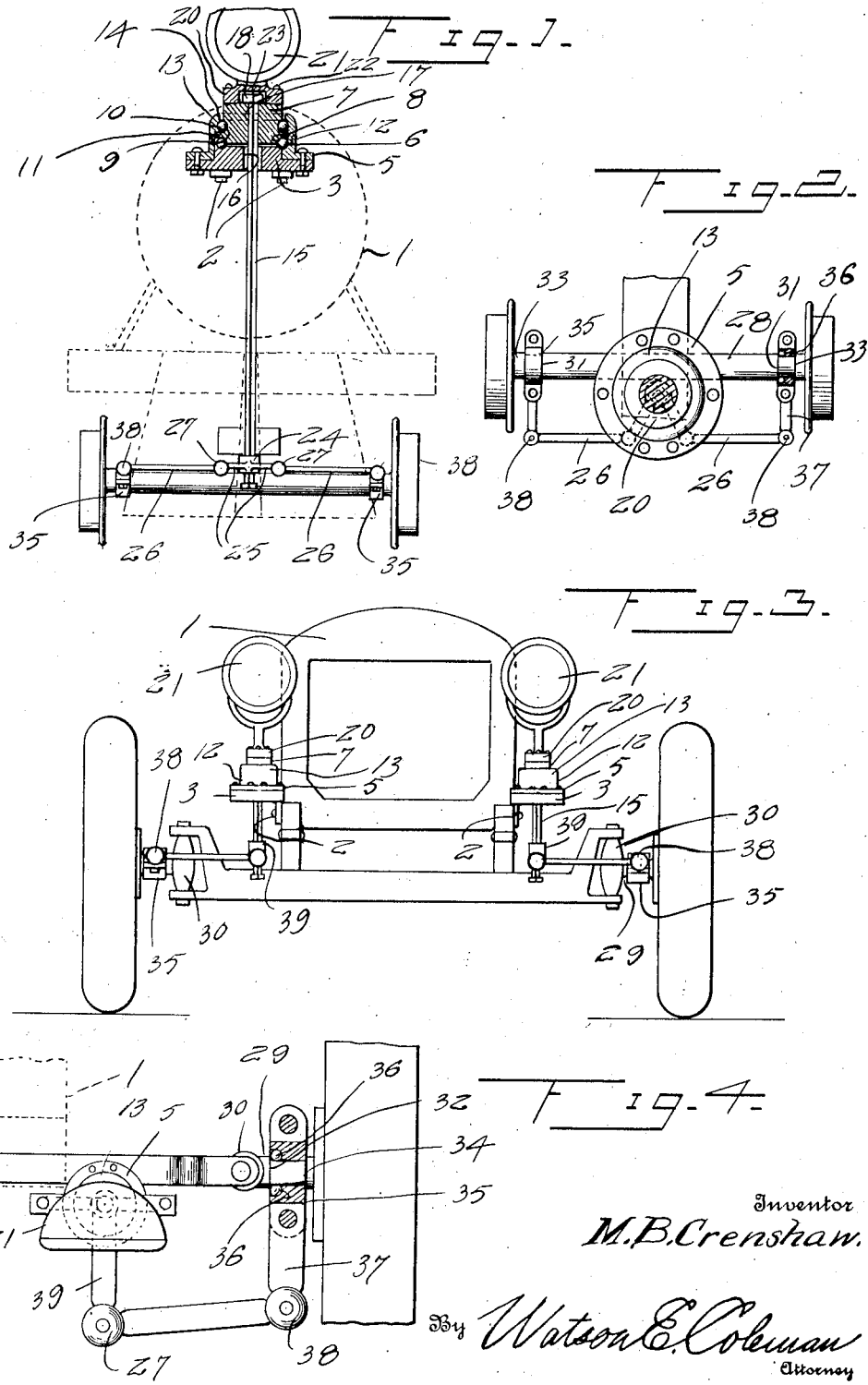

MARVIN BISHOP CRENSHAW, OF DORA, ALABAMA.

DIRIGIBLE-HEADLIGHT MECHANISM.

1,329,505.　　　　Specification of Letters Patent.　　Patented Feb. 3, 1920.

Application filed August 16, 1919. Serial No. 317,905.

*To all whom it may concern:*

Be it known that I, MARVIN B. CRENSHAW, a citizen of the United States, residing at Dora, in the county of Walker and State of Alabama, have invented certain new and useful Improvements in Dirigible-Headlight Mechanism, of which the following is a specification, reference being had to the accompanying drawings.

This invention relates to an improved dirigible headlight mechanism and an object of the invention is to provide a mechanism of this kind for operating a headlight, either for a locomotive or for an automobile, whereby the headlight may turn correspondingly with the front wheels.

A further object of the invention is the provision of a mechanism of this kind including a vertically disposed rocking rod movable with the headlight and depending therefrom and having a link at its lower end slidably connected thereto, which in turn is universally connected to an arm, which has a swivel anti-frictional mounting on the axle of the wheel, whereby as the wheel turns to the right or the left, the headlight is correspondingly moved.

A further object of the invention is the provision of means for swivelly and anti-frictionally mounting the arm on the axle, whereby the vibrations of the headlight with the body of the vehicle or locomotive may be accommodated.

A further feature of the invention is the provision of anti-frictionally mounting the headlight on the body of the vehicle or locomotive, so that the headlight may freely turn correspondingly with the turning of the front wheels.

While the design and construction at present illustrated and set forth are deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:

Figure 1 is a view in front elevation of the improved headlight mechanism as applied to a locomotive, showing the anti-frictional mounting of the headlight in section.

Fig. 2 is a plan view of the headlight mechanism, showing the connection with the lower end of the depending rocking rod of the headlight in dotted lines, and also showing the anti-frictional mounting of the arm, which is carried by the axle, in section.

Fig. 3 is a view in front elevation of a portion of an automobile showing the dirigible headlight mechanism applied.

Fig. 4 is a plan view of Fig. 3, showing the connection with the arm at the lower end of the depending rocking rod of the headlight, and further illustrating the anti-frictional mounting of the arm (which is carried by the stub axle of the front wheel of the automobile) in section.

Referring more especially to the drawings, 1 designates either the front end of the boiler of a locomotive, or the radiator of an automobile, and secured by means of rivets or bolts or the like as shown at 2 either to the radiator or to the boiler is a bracket 3. Secured to the horizontal portion of the bracket by means of the bolts 4 is a bearing plate 5, for the reception of the anti-frictional bearing 6. A headlight supporting block or member 7 is arranged above the plate 5 and is provided with raceways 8 and 9. The raceway 8 engages the anti-frictional bearing 6, while anti-frictional bearings 10 engage the raceway 9. The supporting block or member 7 has an annular flange 11 intermediate the anti-frictional bearings, thereby holding them separated. Threaded to an upwardly extending annular flange 12 of the plate 5 is a retaining ring 13, which has an overlying flange 14, to not only overlie and retain the anti-frictional bearings or balls 10 in position, but also retaining the supporting block or member in position on the anti-frictional bearings 6. A vertical rod 15, which is rectangular in cross-section and rockable about a vertical axis passes upwardly through the openings 16 in the horizontal part of the bracket 3 and the plate 5. The upper end of this rod 15 owing to its rectangular construction, fits fixedly into a correspondingly shaped opening 17 of the headlight supporting block or member, whereby the rod and the headlight may move together. A nut 18 is threaded upon a reduced extension of the upper end of the rod 15, thereby retaining the rod in position, in such wise as to prevent downward movement thereof. The base 20 of the headlight 21 is secured by bolts 22 on the supporting block or member 7, and its under portion is provided with a cavity 23, which receives the nut 18. The base 20 and the headlight 21 move with the supporting block or member 7 and the rod 15, thereby as the front wheels, either of the locomotive or of the automobile, turn either to the right or the left, the headlight will move correspondingly, as will be clearly shown in the further description.

In Fig. 1, which illustrates the dirigible headlight mechanism as applied to a locomotive, the lower end of the rod 15 has fixed thereto in any suitable manner a collar 24, provided with a pair of arms 25, which diverge forwardly and laterally from each other. Transversely disposed rods 26 in Figs. 1 and 2 are universally connected as at 27 to the arms 25.

The axle 28 of the front wheels of the locomotive in Fig. 1, and the stub axle 29 of the knuckle joints 30 of the automobile in Figs. 3 and 4 are provided with shoulders 31 and 32, and additional shoulders 33 and 34. An arm retainer 35, in either case, is arranged between the shoulders, to hold the anti-frictional bearings 36 in place in contact with the shoulders 31 and 32. This retainer is prevented from axial movement by the outer shoulder 33 in Fig. 1, or by the outer shoulder 34 in Fig. 3 and by means of the anti-frictional bearings in either case. Furthermore, the retainer, while it is capable of swiveling or rocking between the shoulders, it is movable rigid with the axle 28 in Fig. 1 or with the stub axle in Figs. 3 and 4, and is provided with a forwardly extending arm 37, which has a universal connection 38 with the rods 26. In Figs. 3 and 4, the lower end of the depending rod 15 of each headlight is provided with a single arm 39 rigidly fixed thereto, to which a link or rod 26 is connected universally. When the body of the locomotive or the body of the automobile vibrates vertically, said vibrations are accommodated, through the medium of the links or rods 26 and their particular connections with the axle 28 in Figs. 1 and 2, or the stub axles in Figs. 3 and 4, and furthermore, when the front wheels of the locomotive or those of the automobile turn in either direction, the headlight will correspondingly move, whereby the rays of the light may readily follow the front wheels in advance thereof.

The invention having been set forth, what is claimed as new and useful is:

1. The combination with a headlight, of means for anti-frictionally mounting the headlight on the body of a vehicle, whereby the headlight may rock about a vertical axis, a rocking rod rectangular in cross-section and fixedly connected to the headlight and depending therefrom and likewise moving about a vertical axis, the lower end of the rod having a fixed forwardly extending arm, an arm retainer anti-frictionally mounted on the axle of the wheel and being rockable about a horizontal axis, yet fixed to the axle against movement axially relatively to the axle, said retainer having a fixed arm extending forwardly and a connection between the two forwardly extending arms.

2. In a dirigible headlight mechanism, the combination with the forward part of the vehicle having a fixed bracket thereon, of a vertical shaft passing upwardly through the bracket and rockable about a vertical axis, a headlight detachably fixed to the upper end of the rod and likewise movable about a vertical axis, an anti-frictional coupling detachably and swivelly connecting the headlight to the bracket, the lower end of the rod having an arm fixed thereto and extending forwardly, a second arm mounted on the axle of a wheel of the vehicle and rockable about a horizontal axis to permit the body of the vehicle to vibrate vertically, said second arm extending forwardly of the axle and being so fixed thereto as to prevent axial and horizontal swinging movement relative to the axle and a connection between the two forwardly extending arms whereby as the wheel of the vehicle turns in one direction or the other, the headlight correspondingly moves.

3. In a dirigible headlight mechanism, the combination with the forward part of a vehicle having a bracket fixed thereto, of a housing coupling detachably fixed on said bracket, a member anti-frictionally and swivelly mounted in said housing coupling and rockable on a vertical axis, a vertical headed rod fixed to said member to likewise move therewith, a headlight having a base detachably connected to said member and fitting over the head of the rod to prevent vertical movement thereof, the lower end of the rod having a forwardly extending arm fixed thereto, an arm retainer mounted on the axle movable about a horizontal axis and fixed against horizontal swinging and axial movements relative to the axle, a second forwardly extending arm fixed to said retainer, and a connection between the two forwardly extending arms.

In testimony whereof I hereunto affix my signature.

MARVIN BISHOP CRENSHAW.